Nov. 9, 1965    R. E. LUNNEY    3,217,239
VOLTAGE CONTROL APPARATUS
Filed Dec. 29, 1961    2 Sheets-Sheet 1

INVENTOR
R. E. LUNNEY
BY
Roy M. Porter Jr.
ATTORNEY

Nov. 9, 1965    R. E. LUNNEY    3,217,239
VOLTAGE CONTROL APPARATUS
Filed Dec. 29, 1961    2 Sheets-Sheet 2

INVENTOR
R. E. LUNNEY
BY
ATTORNEY

United States Patent Office 3,217,239
Patented Nov. 9, 1965

3,217,239
VOLTAGE CONTROL APPARATUS
Raymond E. Lunney, Madison, N.J., assignor to Bell Telephone Laboratories, Incorporated, New York, N.Y., a corporation of New York
Filed Dec. 29, 1961, Ser. No. 163,187
9 Claims. (Cl. 323—43.5)

This invention relates to voltage magnitude control systems and more particularly, although in its broader aspects not exclusively, to apparatus for regulating the magnitude of voltage delivered to a load from a source of alternating-current energy.

Transformers provided with a plurality of winding connections or taps have often been used in voltage control systems. By transferring circuit connections from one tap to another, the "turns-ratio" of the transformer may be changed and the output voltage from the transformer increased or decreased accordingly. It has also been a common practice in the art to provide electromechanical switching means responsive to fluctuations in the output voltage for automatically selecting the appropriate tap such that the voltage delivered to the load is held at a substantially constant value. A principal disadvantage in such arrangements resides in the fact that the output voltage is not continuously variable but rather must exist at a particular one of several discrete levels, the magnitude of each level being determined by the placement of the taps. Furthermore, if the change in tap position should occur while current is flowing in the tap-switch contacts, transient disturbances are introduced. Other disadvantages include the difficulties inherent in mechanical switching, the complexity of the control system needed to actuate the switching elements, and the large relative cost over the conventional transformer.

Another well-known method of voltage magnitude control employs switching elements which are serially connected with the alternating-current supply for deleting predetermined portions of each half-cycle of the energy delivered to the load. In these arrangements, the switching elements generally used are magnetic amplifiers, thyratrons, or solid-state PNPN "controlled rectifiers." By using appropriate control circuitry, the switching elements are "fired" at a selected time in each half-cycle to allow current to pass to the load. By varying the time at which conduction through the switching elements is initiated, the average value of the voltage delivered to the load may be adjusted. Unlike transformer tap-switching apparatus, these arrangements are capable of continuous voltage control. However, they suffer from the disadvantage that the "chopped" waveform delivered to the load circuit has a high harmonic content. The size, complexity, and cost of the filtering equipment needed to eliminate these harmonic components significantly reduces the desirability of the controlled rectifying system.

It is, therefore, a principal object of the present invention to efficiently control the magnitude of voltage delivered to a load from a source of alternating-current energy.

It is a further object of the present invention to accomplish voltage control without producing an undue amount of harmonic content in the output waveform.

It is a still further object of the present invention to control voltage magnitude in a continuous manner.

Still another object of the present invention is to provide a controlled output voltage without the use of complicated or expensive control circuitry.

A related object of this invention is to regulate the effective magnitude of the voltage delivered to a load.

In a principal aspect, the present invention takes the form of a transformer tap-switching arrangement which is interposed between an alternating-current energy source and a load in order to control the magnitude of energy delivered to the load. In accordance with a principal feature of the invention, tap switching occurs at predetermined times within each cycle of the alternating current. As a consequence, the output voltage delivered to the load is transferred from one level to another at selected times during each cycle of the supply voltage. According to another feature of the invention, the angular position of the switching times with respect to the alternating-current waveform is variable such that the average voltage delivered to the load may be adjusted continuously between two limiting values. In accordance with still another feature of the present invention, the transfer of conduction from one transformer tap to another is accomplished electrically by means of a novel arrangement of unilateral switching elements.

A better understanding of the present invention and of the objects, features, and advantages thereof may be gained from a consideration of the following detailed description of three illustrative embodiments of the invention. These embodiments are presented in conjunction with the accompanying drawings, in which.

Figure 1:
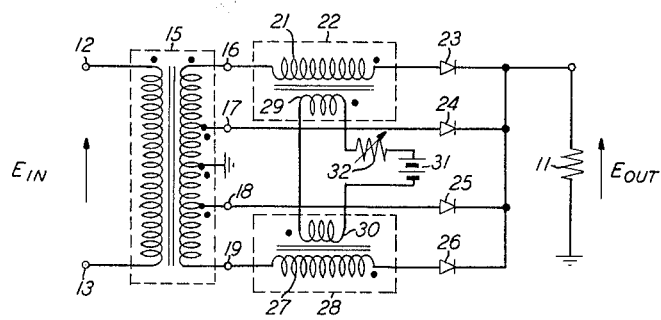
FIG. 1 is a schematic drawing of a simplified A.C. to D.C. voltage magnitude control arrangement which embodies the present invention.

The arrangement shown in FIG. 1 of the drawings utilizes the principles of the present invention to control the average magnitude of the pulsating direct-current voltage applied to the load resistance 11. In this embodiment of the invention, an alternating-current voltage, $E_{in}$, from an available source is applied to the terminals 12 and 13 of the primary winding of the power transformer 15. The transformer 15 is provided with a secondary winding having four output taps 16, 17, 18 and 19, as well as a grounded center-tap connection. Output tap 16 is connected to the load 11 by means of the A.C. winding 21 of magnetic amplifier 22 and the diode 23. The output taps 17 and 18 are connected to load 11 by diodes 24 and 25, respectively. The series combination of diode 26 and the A.C. winding 27 of magnetic amplifier 28 connects tap 19 to load 11. The D.C. control winding 29 of magnetic amplifier 22 is serially connected with D.C. control winding 30 of the magnetic amplifier 28 across a variable current source comprising battery 31 and potentiometer 32.

The magnetic amplifiers 22 and 28 operate as switches, i.e., the A.C. windings 21 and 27 exhibit either a very high or very low transconductive impedance. The switching mode of operation results from the fact that both of the magnetic amplifiers are provided with cores having substantially square hysteresis characteristics. During operation, a D.C. control current whose magnitude is determined by the setting of potentiometer 32 flows through both winding 28 and winding 30. This control current induces a preset flux level in the core of both magnetic amplifiers. By varying the magnitude of the resistance of potentiometer 32, the level of the preset flux may be adjusted.

Figure 2:
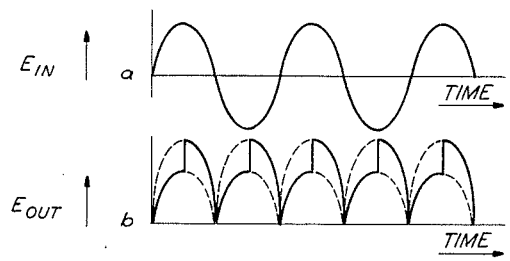
FIG. 2 illustrates waveforms which would typically appear at the input and output terminals of the arrangement shown in FIG. 1.

The operation of the circuit shown in FIG. 1 may best be understood when considered in conjunction with the waveforms shown on lines A and B of FIG. 2. At the beginning of the half cycle when terminal 12 is positive with respect to terminal 13, current flows through the primary winding of transformer 15 and this current induces a voltage which drives both terminals 16 and 17 positive with respect to the grounded center tap connection. Since the core of magnetic amplifier 22 has been preset to a flux level determined by the magnitude of current flow through control winding 29, the core is unsaturated. Consequently, the alternating-current winding 21 exhibits a high inductive impedance which prevents current flow from tap 16 to the load 11. Output terminals 18 and 19 are at this time negative with respect to the grounded center tap terminal and, consequently, diodes 25 and 26 are "back-biased." Current flows, therefore, only from tap 17 through diode 24 and load resistance 11 to ground. During this portion of the first half cycle the forward-biased diode 24 effectively connects the load resistance 11 to the tap 17 such that the voltage across the load resistance follows the lower sinusoid shown in line B of FIG. 2. During this portion of the first half cycle, the potential difference existing between terminals 16 and 17 is applied to the alternating-current winding 21 of the magnetic amplifier 22. This voltage drives the flux level in the core of magnetic amplifier 22 toward saturation. When the core finally saturates (at 90 degrees as shown in line B of FIG. 2), the magnetic amplifier 22 "fires"—that is, the transconductive impedance of winding 21 drops to a very low value. At this time output tap 16 is effectively connected to load resistance 11 and diode 24 becomes back-biased. For the remaining portion of the first half cycle, $E_{out}$ follows the upper sinusoid as shown in FIG. 2, line B.

During the second half cycle, conduction is transferred from tap 18 to tap 19 in a similar manner when magnetic amplifier 28 fires. During this second half cycle, the voltage induced across terminals 16 and 17 is of opposite polarity to that of the first half cycle and diode 23 is back-biased. With diode 23 back-biased, the control winding 29 re-establishes the present flux level in magnetic amplifier 22. The conditions of steady state operation are fulfilled since during the third half cycle the core of magnetic amplifier 28 will also be returned to a preset flux level.

The firing time of the magnetic amplifiers is determined by the following relation derived from Faraday's law:

$$\int_{T_1}^{T_2} e \, dt = N(\Phi_s - \Phi_1)$$

where:

$e$ is the voltage applied across the alternating-current winding;

N is the number of turns of the alternating-current winding;

$T_2 - T_1$ is the elapsed time between the start of a half cycle and the firing time;

$\Phi_s$ is the saturation flux; and $\Phi_1$ the preset flux level.

This means that it takes a definite volt-time area of voltage across the alternating-current winding of the magnetic amplifier to change the state of the core from a given preset flux level, $\Phi_1$, to the "firing" flux level, $\Phi_s$. As may be readily appreciated, the time at which conduction is transferred from one tap to another may be adjusted by varying the control current applied to the control windings 29 and 30. In order to increase the firing time (and accordingly to decrease the average output voltage delivered to the load), the control current may be adjusted such that the total flux change $(\Phi_s - \Phi_1)$, is larger.

Since the magnetic amplifiers operate in the switching mode and dissipate little power, the voltage control arrangement shown in FIG. 1 is highly efficient—the efficiency being approximately equal to that of the power transformer. A frequency analysis of waveforms of the output pictured in line B of FIG. 2 shows that, since the output voltage is not constrained to be zero over an appreciable portion of the cycle, the harmonic content of the output energy is significantly decreased from that observed in more conventional systems. In consequence, the cost and size of the filtering equipment needed to suppress undesirable frequency components is considerably reduced.

Figure 3:
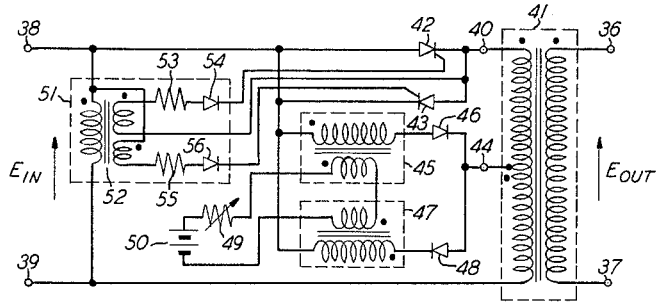
FIG. 3 is a schematic drawing of an A.C. to A.C. voltage control arrangement which embodies the principles of the present invention.

The arrangement shown in FIG. 3 of the drawings is capable of controlling the average magnitude of the alternating-current energy delivered to output terminals 36 and 37. An alternating-current voltage from an available source is applied to terminals 38 and 39. Terminal 38 is connected to the connection 40 on the primary winding of transformer 41 by means of a pair of controlled rectifiers, 42 and 43. Controlled rectifiers 42 and 43 are connected in parallel, rectifier 42 being poled such that, when it conducts, positive current is allowed to flow toward connection 40. Rectifier 43 is poled in the opposite direction. A second winding connection 44 is also connected to terminal 38 by means of the series combination of the A.C. winding of magnetic amplifier 45 and diode 46 and by means of the series combination of the A.C. winding of magnetic amplifier 47 and diode 48. Diodes 46 and 48 are poled in opposite directions. The control windings of magnetic amplifiers 45 and 47 are connected in series with a variable resistance 49 and a battery 50.

Each of the controlled rectifiers 42 and 43 is provided with a gating electrode. These rectifiers, sometimes termed "solid-state thyratrons," conduct only when they are both forward-biased and gated "ON" by the application of a positive potential to the gating electrode. In this arrangement, the appropriate gating potentials are supplied by network 51. This network comprises a small transformer 52 whose primary winding is connected to the A.C. input terminals 38 and 39. Transformer 52 is provided with a pair of secondary windings. The gating electrode of rectifier 42 is connected to terminal 40 by means of the series combination of resistance 53, diode 54, and the first secondary winding of transformer 52. The series combination of resistance 55, diode 56 and the second secondary winding on transformer 52 connects the gating electrode of rectifier 43 to the terminal 38.

Figure 4:
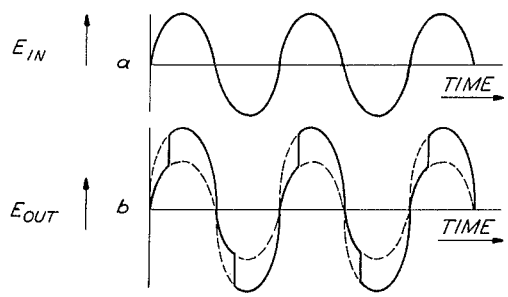
FIG. 4 illustrates the input and output waveforms of the embodiment shown in FIG. 3.

The operation of the voltage control arrangement shown in FIG. 3 may best be understood when considered in conjunction with the waveforms shown in FIG. 4. The waveform of the alternating-current voltage, $E_{in}$, which is applied to terminals 38 and 39 is shown on line A of FIG. 4. During the early portion of the half cycle in which terminal 38 is positive with respect to the terminal 39, rectifier 42 is forward-biased. Network 51 applies a positive gating potential to the gating electrode of rectifier 42 and it conducts, allowing current to flow from terminal 38 to connection 40 on the primary winding of transformer 41. Rectifier 43, being back-biased, does not conduct. Connection 44 is at a lower potential than terminal 38 and a potential exists across the back-biased diode 48. Since diode 46 is forward-biased, substantially the same potential exists across the A.C. winding of the unsaturated magnetic amplifier 45. This potential alters the flux level in the core of magnetic amplifier 45 toward saturation. When saturation occurs, the magnetic amplifier fires and conduction is transferred from connection 40 to connection 44. At this time, the potential connection 40 is raised to a higher level than that of terminal 38 by autotransformer action, thereby back-biasing controlled rectifier 42. Rectifier 43, though forward-biased, cannot conduct since during this half cycle no positive potential is applied to its gating electrode by network 51.

During the following half cycle, when terminal 38 is more negative than terminal 39, substantially the same process occurs—this time conduction being transferred from rectifier 43 to magnetic amplifier 47. During this half cycle, diode 46 is back-biased, preventing current flow through the A.C. winding of magnetic amplifier 45, and allowing the current through the control winding to reestablish the desired preset flux level in the core. As discussed in conjunction with FIG. 1 of the drawings, variations in the magnitude of the D.C. control current delivered to the control windings change the firing times within each cycle. By decreasing the value of resistance 49, an increased current flows thus tending to advance the firing times of the magnetic amplifiers. Since the average magnitude of the A.C. output voltage delivered to output terminals 36 and 37 is dependent upon the relative angular position of the firing times, the output voltage may be controlled. Line B of FIG. 4 shows a typical output waveform where the firing times have been adjusted to occur at around 60 degrees after the beginning of each half cycle.

Figure 5:
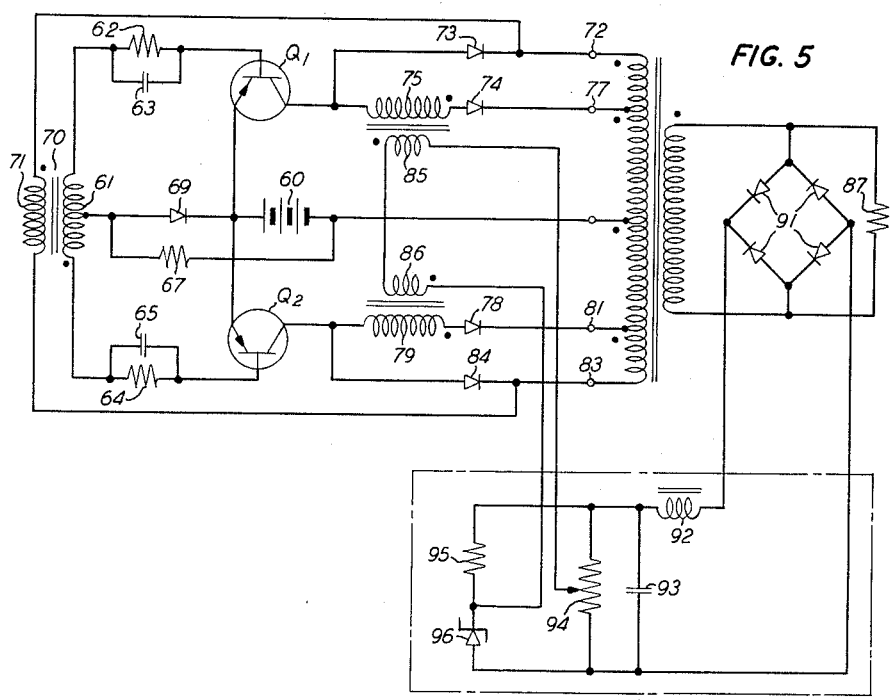
FIG. 5 is a schematic representation of a transistor-core inverter which employs the principles of the present invention to provide voltage magnitude control.
Figure 6A:
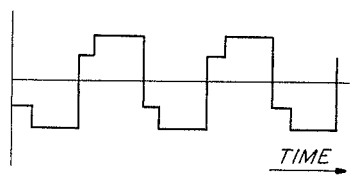
FIGS. 6A, 6B, 6C illustrate various waveforms which might typically appear at the output of the inverter circuit shown in FIG. 5.
Figure 6B:
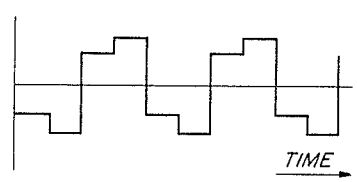
Figure 6C:
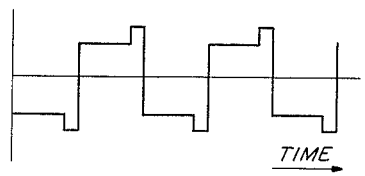

FIG. 5 illustrates an application of the principles of the invention to control the output voltage magnitude delivered by a transistor-core inverter. In FIG. 5 the positive terminal of a direct-current supply voltage source 60 is directly connected to the emitter electrodes of transistors $Q_1$ and $Q_2$. The base electrode of transistor $Q_1$ is connected to one side of winding 61 by means of the parallel combination of resistance 62 and capacitor 63. The other side of winding 61 is connected to the base of transistor $Q_2$ by the parallel combination of resistance 64 and capacitor 65. A center-tap connection on winding 61 is connected to the negative terminal of battery 60 by means of a starting resistor 67. Diode 69 is connected between the center-tap and the positive terminal of battery 60. Winding 61 is provided with a saturable core 70. An additional winding 71 is also wound on core 70.

The collector electrode of transistor $Q_1$ is connected to terminal 72 by means of diode 73. The serial combination of diode 74 and alternating-current winding 75 connects the collector electrode of transistor $Q_1$ to terminal 77. A similar arrangement comprising diode 78 and alternating-current winding 79 connects terminal 81 to the collector electrode of transistor $Q_2$. The collector electrode of transistor $Q_2$ is also connected to terminal 83 by means of diode 84. A center-tap connection of the primary winding of the power transformer is connected to the negative terminal of battery 60. Control windings 85 and 86 are wound with windings 75 and 79, respectively. A load resistance 87 is connected across the secondary terminals of the power transformer. A full wave bridge rectifier comprising diodes 91 is also connected across the secondary winding of the power transformer. The rectified, pulsating direct current from the bridge rectifier is applied to a filtering circuit comprising choke 92 and capacitor 93. The filtered direct-current voltage is then applied to a potentiometer 94 and to a voltage standard comprising resistance 95 and Zener diode 96. Control windings 85 and 86 are connected in series between the adjustable tap on potentiometer 94 and the juncture of Zener diode 96 and resistance 95.

The operation of the transistor core inverter circuitry shown in FIG. 5 is well known and need not be discussed in detail. In operation, transistors $Q_1$ and $Q_2$ will repetitiously switch from a nonconductive "off" condition to a highly conductive, saturated "on" condition in phase opposition. When transistor $Q_1$ switches "on," the positive voltage from battery 60 is initially applied to terminal 72 by transistor $Q_1$ and the forward-biased diode 73. In a manner similar to that discussed in conjunction with FIG. 1 of the drawings, the upper magnetic amplifier eventually fires, allowing current to pass through the alternating-current winding 75. The upper terminal 72 is raised to a higher potential by autotransformer action thereby back-biasing diode 73. Because of the positive potential existing on terminal 72 during this half cycle, a current flows from terminal 72 through winding 71 to the more negative terminal 83. The current flowing through winding 71 induces a forward-biasing voltage in winding 61 which holds transistor $Q_1$ in an "on" condition. Eventually, however, the core 70 saturates and the forward bias is removed from transistor $Q_1$. As the transconductive path of transistor $Q_1$ begins to exhibit a substantial impedance, the voltage at terminal 72 drops, the current through winding 71 decreases abruptly, and the voltage induced in winding 61 turns "on" transistor $Q_2$.

In order to more readily understand the operation of those aspects of the arrangement shown in FIG. 5 which are contemplated by the present invention, it will be helpful to notice that a square wave voltage appears at the collector electrodes of transistors $Q_1$ and $Q_2$.

When transistor $Q_1$ is initially turned "on," current flows from the positive terminal of battery 60, through transistor $Q_1$ and diode 73 to terminal 72. Since terminal 77 is at a somewhat lower potential than the collector electrode of transistor $Q_1$, a potential exists across the A.C. winding 75 which tends to saturate the core. Eventually the magnetic amplifier "fires," transferring conduction to terminal 77. The potential at terminal 72 is then raised by autotransformer action to a level somewhat higher than that at the collector of transistor $Q_1$. Diode 73 therefore becomes back-biased, preventing circulating currents from flowing. During the half cycle in which transistor $Q_2$ is "on" and $Q_1$ is "off," substantially the same action takes place with conduction being transferred from terminal 83 to terminal 81.

As discussed in connection with FIGS. 1 and 3 of the drawings, the magnitude of D.C. current delivered to the control windings of the magnetic amplifiers determines the average magnitude of the output voltage. As contemplated by one aspect of the invention which is embodied in the arrangement shown in FIG. 5 of the drawings, means are employed for developing a control current whose magnitude is related to the magnitude of the output voltage, thereby accomplishing voltage regulation. As shown in FIG. 5, a voltage is developed at the adjustable tap on potentiometer 94 which is related to the magnitude of the A.C. voltage delivered to load 87. A voltage having a fixed, standard magnitude is developed at the juncture of Zener diode 96 and resistance 95. The difference in these two voltages is then applied to the control windings 85 and 86 such that the output voltage from the inverter is used to regulate the firing times of the magnetic amplifier. By way of example, suppose the voltage delivered to the load 87 increases slightly. This also raises the potential at the movable tap of potentiometer 94 such that the magnitude of current flowing in the control windings 85 and 86 is altered. In response to this variation, the present flux is moved away from saturation, thereby tending to retard the firing times and lowering the average magnitude of the output voltage.

It is also of interest to note that the frequency of inverter alternation is dependent upon the rate at which core 70 of the transistor driving transformer saturates. Since this rate is in turn dependent upon the average magnitude of the voltage delivered to the primary of the power transformer, the same voltage which is being regulated by the arrangement, the frequency of alternation is also regulated. This is a marked contrast to the usual transistor-core inverter circuitry wherein the frequency of alternation is greatly affected by fluctuations in load and supply voltage parameters.

The three embodiments of the invention which are herein disclosed are, of course, merely illustrative of the principles of the invention, numerous other arrangements will be obvious to those skilled in the art without departing from the true spirit and scope of the invention.

What is claimed is:

1. In a voltage control system, a transformer interposed between a source of alternating-current energy and a load, said transformer having a plurality of taps thereon, switching means for repeatedly altering the turns-ratio of said transformer by transferring circuit connections from one tap to another at selected switching times in each cycle of said alternating-current energy, and control means for varying the relative time position of said switching times within each cycle whereby the average voltage delivered to said load may be adjusted.

2. In a voltage control system, a source of alternating-current energy, a load, a transformer interposed between said source and said load, said transformer having at least first and second taps affixed thereon, switching means for repeatedly altering the turns-ratio of said transformer by transferring the conduction of transformer current from said first tap to said second tap at a predetermined time in each cycle of said alternating-current energy, and means for varying the time position of said predetermined time relative to the phase angle of said alternating-current energy whereby the average voltage delivered to said load may be adjusted.

3. An arrangement as set forth in claim 2 characterized in that said switching means comprise a first diode serially connected with said first tap and a saturable reactor and a second diode serially connected with said second tap.

4. Apparatus for regulating the magnitude of alternating-current energy delivered from a source to a load which comprises, in combination, a transformer interposed between said source and said load, said transformer having a plurality of taps affixed thereon, switching means for repeatedly altering the turns-ratio of said transformer by transferring the conduction of transformer current from one tap to another at selected switching times in each cycle of said alternating-current energy, and control means responsive to fluctuations in the average value of load voltage for varying the relative time position of said switching times within each cycle.

5. In combination with a source of alternating-current energy and a load, apparatus for regulating the average magnitude of the voltage applied to said load from said source which comprises, in combination, a transformer interposed between said source and said load, said transformer being provided with at least first and second taps affixed thereon, switching means for repeatedly altering the turns-ratio of said transformer by transferring the conduction of transformer current from said first tap to said second tap at selected times within each cycle of said alternating-current energy, said switching means comprising a first diode serially connected with said first tap and a second diode and a saturable reactor serially connected with said second tap, a control winding on said saturable reactor, means responsive to fluctuations in the average magnitude of the load voltage for generating a control current, and circuit means for applying said control current to said control winding whereby the average magnitude of the load voltage is maintained at a substantially constant value.

6. In combination a source of an alternating-current voltage, a load, a transformer connected between said source and said load, means for altering the turns-ratio of said transformer at a selected switching time during each cycle of said alternating-current voltage, and means for varying the relative angular position of said switching time with respect to said alternating-current voltage.

7. In a voltage control system, a source of alternating-current energy having first and second terminals, a transformer having a primary winding and a secondary winding, said primary winding having first, second and third taps affixed thereon, a load connected to said secondary winding, and means for altering the turns-ratio of said transformer at a selected switching time in each cycle of said alternating-current energy which comprises, in combination, circuit means for connecting said first terminal to said first tap, a diode connected between said second terminal and said second tap, and the series combination of a diode and a saturable reactor connected between said second terminal and said third tap, a control winding on said saturable reactor, a source of a control current connected to said control winding for determining the time-position of said selected time, and means for varying the magnitude of said control current to vary the average magnitude of voltage delivered to said load.

8. A power control circuit for interconnecting a source of an alternating-current voltage with a load which comprises, in combination, a pair of power-carrying conductors, a transformer having first and second windings, at least first, second and third winding taps each connected to a different point on said first winding, circuit means for connecting said first tap to one of said power-carrying conductors, switching means for transferring the connection of the other of said conductors from said second tap to said third tap such that actuation of said switching means alters the turns-ratio of said transformer, means for repeatedly actuating said switching means at a selected time in each cycle of said alternating-current voltage, and means for varying the relative angular position of said switching time with respect to said alternating-current voltage whereby the average magnitude of voltage delivered to said load is controlled.

9. A power control circuit as set forth in claim 8 wherein said switching means comprises, in combination, a saturable inductor and a diode connected in series between said other power-carrying conductor and said third tap, and a diode connected between said other conductor and said second tap, and wherein said means for varying the relative angular position of said switching time comprises means for varying the residual flux level in the core of said saturable inductor whereby the time at which said core becomes saturated is varied.

References Cited by the Examiner
UNITED STATES PATENTS

| | | | |
|---|---|---|---|
| 2,959,726 | 11/60 | Jensen | 321—18 |
| 3,072,838 | 1/63 | Hetzler et al. | 321—25 |

FOREIGN PATENTS

| | | |
|---|---|---|
| 790,123 | 2/58 | Great Britain. |

LLOYD McCOLLUM, *Primary Examiner.*